(No Model.)
W. H. DEIDRICK.
DIRT SCRAPER.
No. 275,893. Patented Apr. 17, 1883.
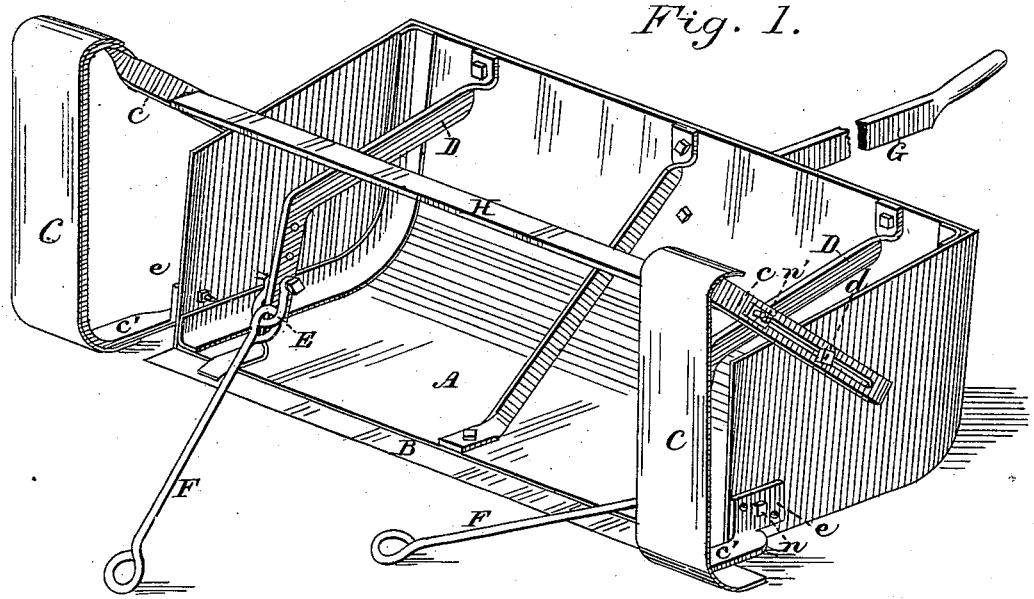
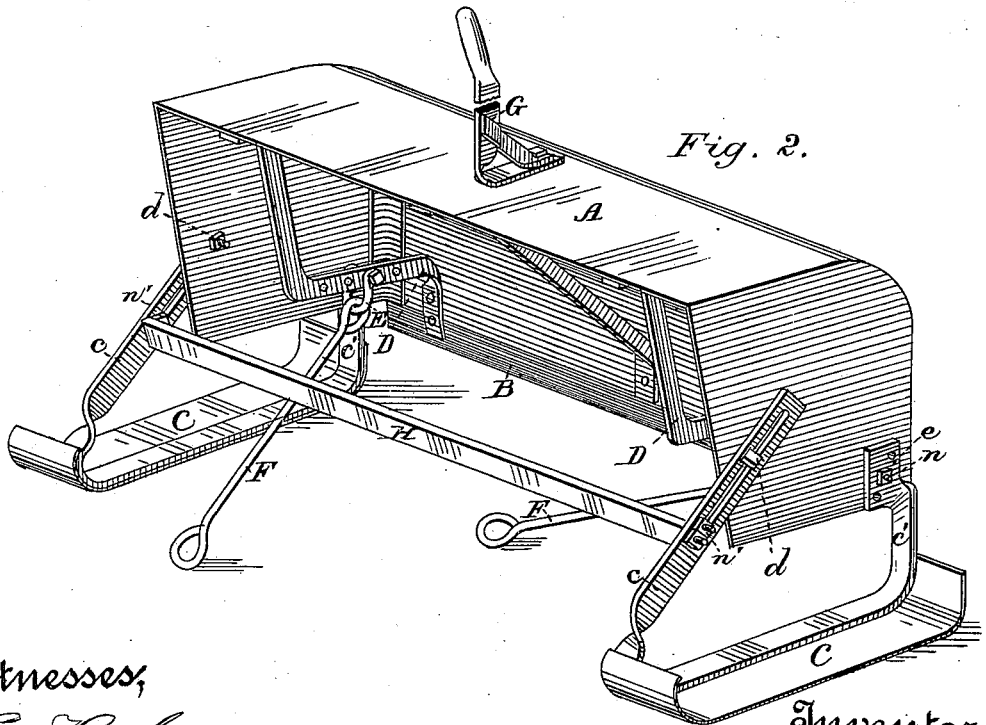
Witnesses:
Geo. C. Strong.
J. H. Towne
Inventor
Wm. H. Deidrick,
Dewey & Co.
Attorneys.
N. PETERS, Photo-Lithographer, Washington, D. C.

UNITED STATES PATENT OFFICE.

WILLIAM H. DEIDRICK, OF SELMA, CALIFORNIA.

DIRT-SCRAPER.

SPECIFICATION forming part of Letters Patent No. 275,893, dated April 17, 1883.

Application filed January 6, 1883. (No model.)

*To all whom it may concern:*

Be it known that I, WILLIAM H. DEIDRICK, of Selma, county of Fresno, State of California, have invented an Improved Dirt-Scraper; and I hereby declare the following to be a full, clear, and exact description thereof.

My invention relates to the class of dirt-scrapers used for leveling land, and more especially to certain new and useful improvements in said scrapers.

My invention consists in adjustable runners upon which the bowl of the scraper may run when dumped, in adjustable draft-bars, and in an adjustable stop to limit the dump of the bowl.

The object of these several improvements is, first, by adjusting the runners to so regulate the height of the bowl, and especially its bit, from the ground that the dirt shall be dumped either suddenly in one place or gradually discharged and scraped over the ground, as the necessity of the case may require; second, to graduate the power required to make the bit take hold of the ground and to dump the bowl as may be desired and, lastly, to limit the dump at any desired point.

Referring to the accompanying drawings, Figure 1 is a perspective view of my dirt-scraper. Fig. 2 shows the dirt-scraper dumped.

Let A represent the bowl of the scraper, having the knife or bit B.

C represents the runners, secured to the ends of the bowl, and extending in front, as shown in Fig. 1, but serving to support said bowl when turned over or dumped, as in Fig. 2. The object of runners secured in this position is to support the device when dumped, raising it clear of the ground. Now, it is obvious that if these runners be placed in front of the bowl and there fixed, the latter will always be raised the same distance from the ground, no matter what may be the necessities of the case. It may be working in a place where the load should be dumped bodily in one place to fill in; or it may be working where only a thin layer may be required to be spread over some extent. To meet these cases I render these runners adjustable, so that at pleasure they may be extended far enough to raise the bowl and bit sufficiently high to discharge all the load at once, or may be drawn back to barely raise the bit enough to allow the dirt to discharge gradually and be scraped along. The form of adjustment I use is as follows: The runners are wide flat pieces braced by strips, the ends $c$ $c'$ of which secure them to the ends of the bowl. The end $c$ is slotted and receives a bolt, $d$, with a nut. By loosening this bolt the end may be slipped back or forward to adjust the runner. The other end, $c'$, has a flat plate, $e$, provided with a number of holes. A bolt, $n$, with a nut extends through the end of the bowl and is secured in the plate $e$. By passing the bolt into any of the series of holes in the plate the runner may be adjusted at that end also. Now, when it is desired to raise the whole bowl from the ground both ends $c$ $c'$ must be adjusted; but when it is desired to effect more particularly the bit the ends $c'$ may alone be moved. Thus the bowl and bit may be raised clear to discharge the entire load in one place, or may be raised sufficiently to scrape the dirt along. Inside of the bowl are the bent braces D, the lower arms of which are provided with a number of holes. A link, E, is adapted by a bolt to be secured in any of these holes, and the draft-rods F F are secured to the links. At the back of the bowl is secured the handle G, by which it is turned. If the draft-rods be fixed in the highest of the series of holes in braces D, it is obvious that it will require less power to operate the handle to throw the bit into the ground or to dump the bowl than if they were fixed in the lowest of said holes. This adjustment is of advantage in places where the driver wishes to take a deeper or more shallow cut, or where, as on an inclination, it is harder to turn the bowl.

When the bowl is turned it is supported on its runners C, and the handle is not in the way of the horses; but this is only on level ground. In going down a steep declivity the runners would turn up on their edges and throw the handle too far forward. To obviate this some kind of a stop is necessary, and, moreover, it should be adjustable.

H is a cross-bar, the ends of which are fitted loosely in the slotted strips $c$, and are secured by a nut and shoulder. Short bolts $n'$, with nuts, pass through the same slots. By setting up these bolts $n'$ the cross-bar H can be moved and held farther out. In this manner the cross-bar can be set to suit the declivity, and by coming in contact with the draft-rods prevent the bowl from turning too far. Likewise it can be given a further dump by setting back the bar. This bar or stop is necessary only when the grade is steep enough to turn the runners up on edge; but in ordinary cases it will not come in contact with the draft-rods. In this particular it is different from when wheels are used, as in that case the stop must rest upon the draft-rods all the time when the bowl is turned. This is a disadvantage in the constant vibration imparted to the bowl from the draft-rods when the former is resting upon them and the horses are moving. The stop-bar H in my device has to be adjustable to conform to the different adjustments of the runners.

In addition to making my stop-bar H loosely adjustable, as shown, I could with like effect, by putting springs behind it, make it yielding to relieve the vibration when resting on the draft-rods.

I am aware that there is nothing new in runners upon which the bowl is supported when dumped, and that pivoted draft-rods have been used. I also know that a stop-bar coming in contact with the draft-rods is also known; but in these instances the runners and draft-rods are fixed and the stop-bar is solidly secured, having no adjustment or yielding whatever. Therefore I only claim as my invention and new these devices as adjustable for the purposes I have described.

Having thus described my invention, what I claim as new, and desire to secure by Letters Patent, is—

1. In a dirt-scraper, the turning bowl A, in combination with the runners C, secured to the ends of the scraper-bowl, and a means for rendering said runners adjustable to raise or lower said bowl when dumped, substantially as and for the purpose herein described.

2. In a dirt scraper, the turning bowl A, in combination with the runners C and the means for connecting them with the bowl and rendering them adjustable, consisting of the slotted connecting-bars c, securing-bolts d, connecting-bars c', having plates e, with a series of holes, and securing-bolts n, substantially as herein described.

3. In a dirt-scraper, the bowl A and the bent braces D, having a series of holes in their lower arms, in combination with the adjustable links E and the draft-rods F F, substantially as herein described.

4. In a dirt-scraper, the turning bowl A, having handle G and draft-rods F F, in combination with a stop adapted to come in contact with the draft-bars and limit the dump of the bowl, and a means for adjusting said stop forward or back, substantially as and for the purpose herein described.

5. In a dirt-scraper, the turning bowl A, having handle G, draft-rods F F, and adjustable runners C, in combination with an adjustable stop secured between the runners and adapted to come in contact with the draft-bars when the bowl is dumped, substantially as herein described.

6. In a dirt-scraper, the turning bowl A, having handle G, draft-rods F F, adjustable runners C, and slotted bars c, in combination with the stop-bar H, the ends of which move in said slotted bars, and the adjustable stop-bolts n', substantially as and for the purpose herein described.

In witness whereof I hereunto set my hand.

W. H. DEIDRICK.

Witnesses:
S. L. HOGUE,
N. JOHNSON.